(12) United States Patent
Miyakawa et al.

(10) Patent No.: US 8,781,315 B2
(45) Date of Patent: Jul. 15, 2014

(54) CAMERA ACCESSORY DEVICE THAT IS REMOVABLY ATTACHED TO CAMERA-SIDE ACCESSORY SHOE

(71) Applicant: Canon Kabushiki Kaisha, Tokyo (JP)

(72) Inventors: Toshiki Miyakawa, Yokohama (JP);
Kenichiro Yamashita, Nagareyama (JP)

(73) Assignee: Canon Kabushiki Kaisha (JP)

( * ) Notice: Subject to any disclaimer, the term of this patent is extended or adjusted under 35 U.S.C. 154(b) by 0 days.

(21) Appl. No.: 13/780,376

(22) Filed: Feb. 28, 2013

(65) Prior Publication Data

US 2013/0223831 A1 Aug. 29, 2013

(30) Foreign Application Priority Data

Feb. 28, 2012 (JP) ................. 2012-041573
Feb. 28, 2012 (JP) ................. 2012-041574

(51) Int. Cl.
*G03B 15/03* (2006.01)

(52) U.S. Cl.
USPC .......................................................... 396/155

(58) Field of Classification Search
USPC .......................................................... 396/155
See application file for complete search history.

(56) References Cited

U.S. PATENT DOCUMENTS

| 4,249,813 A * | 2/1981 | Nihei ............................ 396/203 |
| 4,666,276 A * | 5/1987 | Chan ............................ 396/180 |
| 7,623,773 B2 * | 11/2009 | Yamashita ...................... 396/29 |
| 8,019,214 B2 * | 9/2011 | Hwang ........................... 396/198 |
| 8,098,326 B2 | 1/2012 | Takashima et al. |
| 8,526,809 B2 * | 9/2013 | Kim et al. ...................... 396/198 |

FOREIGN PATENT DOCUMENTS

| CN | 201936104 U | 8/2011 |
| JP | 2008-175924 A | 7/2008 |
| TW | 200605643 B | 1/2009 |

OTHER PUBLICATIONS

Taiwanese Office Action issued in counter part Patent Application No. 102106605 dated Apr. 11, 2014. English translation provided.

* cited by examiner

*Primary Examiner* — Rodney Fuller
(74) *Attorney, Agent, or Firm* — Rossi, Kimms & McDowell LLP

(57) ABSTRACT

A camera accessory device which not only makes it possible to prevent a camera-side accessory shoe from being scratched thereby, but also encores positive electrical connection between the camera accessory device and a camera. The camera accessory device comprises a lock lever, a shoe bracket for engagement with the camera-side accessory shoe, contact pins for contact with respective electric contacts of the camera-side accessory shoe, a contact spring-holding member, and an accessory shoe-holding member which moves, in accordance with rotation of the lock lever, to a shoe member-locking position or to a shoe member-unlocking position. The contact pins are urged by the holding members such that urging forces applied to the electric contacts become larger when the accessory shoe-holding member has moved to the shoe member locking position than when the same has moved to the shoe member unlocking position.

13 Claims, 11 Drawing Sheets

CAMERA ACCESSORY DEVICE THAT IS REMOVABLY ATTACHED TO CAMERA-SIDE ACCESSORY SHOE

BACKGROUND OF THE INVENTION

1. Field of the Invention

The present invention relates to a camera accessory device that is attached to a camera-side accessory shoe, and more particularly to a camera accessory device provided with contact pins for electrical connection to an electronic circuit of a camera.

2. Description of the Related Art

As a camera accessory device provided with contact pins for electrical connection to the electronic circuit of a camera, there has been proposed a flash device that has spring-urged contact pins thereof brought into contact with electric contacts of the camera-side accessory shoe, in a state attached to a camera-side accessory shoe (see Japanese Patent Laid-Open Publication No. 2008-175924).

Incidentally, the contact pins of the camera accessory device and the electric contacts of the camera-side accessory shoe are usually in an exposed state, and hence oxide films are formed on the contact pins and the electric contacts e.g. due to being left exposed for a long time, causing increased electric contact resistance, which sometimes causes a malfunction.

However, assuming that a large urging force as will completely destroy the formed oxide films is applied to the contact pins of the flash device proposed in Japanese Patent Laid-Open Publication No. 2008-175924, the contact pins protruded during attachment of the flash device to the camera-side accessory shoe slide on the electric contacts of the camera-side accessory shoe and resin portions surrounding the electric contacts.

For this reason, a plurality of repetitions of attachment and removal of the flash device produce scratches on the camera-side accessory shoe, causing appearance problems. Further, resin powder or the like can cause contact failure.

SUMMARY OF THE INVENTION

The present invention provides a camera accessory device which not only makes it possible to prevent a camera-side accessory shoe from being scratched by a plurality of repetitions of attachment and removal of the camera accessory device, but also ensures that electrical connection is reliably established between the camera accessory device and a camera without being affected by oxide films or the like.

In a first aspect of the present invention, there is provided a camera accessory device that is removably attached to a camera-side accessory shoe having an electric contact, comprising an operation member, a shoe member configured to be engaged with the camera-side accessory shoe, a contact pin configured to be held in contact with the electric contact in a state where the shoe member is engaged with the camera-side accessory shoe, and a moving member configured to be movable, in accordance with operation of the operation member, to a shoe member-locking position for locking the shoe member to the camera-side accessory shoe and a shoe member-unlocking position for unlocking the shoe member from the camera-side accessory shoe, wherein the contact pin is urged by the moving member such that an urging force applied to the electric contact becomes larger when the moving member has moved to the shoe member-locking position than when the moving member has moved to the shoe member-unlocking position.

In a second aspect of the present invention, there is provided a camera accessory device that is removably attached to a camera-side accessory shoe having an electric contact, comprising a contact pin held in contact with the electric contact in a state where the camera accessory device is attached to the camera-side accessory shoe, a first member configured to be movable in an urging direction of the contact pin, a second member configured to be movable in a direction orthogonal to the urging direction of the contact pin, an operation member configured to be operable between a locking position for locking the camera accessory device to the camera-side accessory shoe and an unlocking position for unlocking the camera accessory device from the camera-side accessory shoe, in the state where the camera accessory device is attached to the camera-side accessory shoe, a first cam mechanism provided between the operation member and the second member and configured to move the second member in accordance with operation of the operation member, and a second cam mechanism provided between the second member and the first member and configured to move the first member in accordance with motion of the second member, wherein when the operation member is operated from the unlocking position to the locking position, the first member moves in a direction of increasing an urging force of the contact pin against the electric contact.

In a third aspect of the present invention, there is provided an accessory device that is removably attached to an image pickup apparatus, comprising a moving member configured to be movable to a first position for locking the accessory device to the image pickup apparatus to which the accessory device is attached and a second position for unlocking the accessory device from the image pickup apparatus to which the accessory device is attached, a contact member configured to be brought into contact with an electric contact provided on the image pickup apparatus to which the accessory device is attached, the contact member protruding in a direction of being brought into contact with the electric contact, and an urging mechanism configured to increase an urging force for urging the contact member in a direction in which the contact member is brought into contact with the electric contact, in accordance with movement of the moving member from the second position to the first position.

According to the camera accessory device of the present invention, if is possible to prevent the camera-side accessory shoe from being scratched by a plurality of repetitions of attachment and removal of the camera accessory device, but also to establish positive electrical connection between the camera accessory device and a camera without being affected by oxide films or the like.

Further features of the present invention will become apparent from the following description of exemplary embodiments with reference to the attached drawings.

DESCRIPTION OF THE EMBODIMENTS

The present invention will now be described in detail below with reference to the accompanying drawings showing embodiments thereof.

Figure 1:
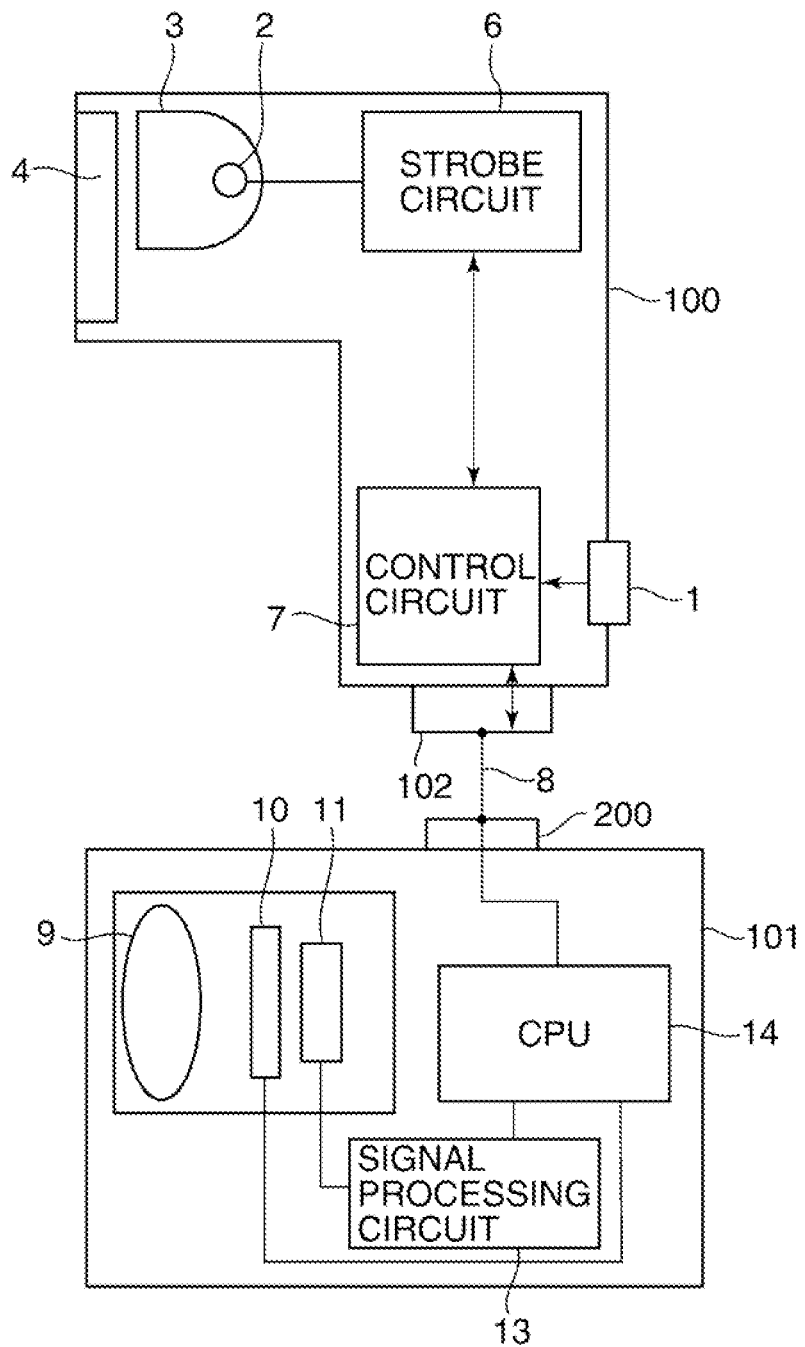
FIG. 1 is a schematic block diagram showing a state where a flash device as a camera accessory device according to a first embodiment of the present invention is connected to a digital camera.

First, a first embodiment of the present invention will be described with reference to FIGS. 1 to 6B. FIG. 1 is a schematic block diagram showing a state where a flash device as a camera accessory device according to the first embodiment is connected to a digital camera.

Referring to FIG. 1, the digital camera (hereinafter simply referred to as "the camera"), denoted by reference numeral 101, includes a photographic lens 9, a diaphragm 10, an image pickup device 11, a camera-side accessory shoe 200, a signal processing circuit 13, and a CPU 14.

An object image having passed through the photographic lens 9 is formed on the image pickup device 11, and an image signal output from the image pickup device 11 is subjected to predetermined signal processing by the signal processing circuit 13.

The flash device 100 includes a rear-surface console section 1, a xenon tube 2, a reflector 3, a Fresnel lens 4, a flash circuit 6, a control circuit 7, and an accessory shoe 102.

Flash light emitted from the xenon tube 2 is reflected by the reflector 3, and the Fresnel lens 4 controls distribution of the reflected light flux reflected by the reflector 3. The flash circuit 6 includes a booster circuit and a trigger circuit which are provided for causing light emission of the xenon tube 2.

Contact pins 8 of the accessory shoe 102 are electrically connected to the camera-side accessory shoe 200 to thereby enable communication between the control circuit 7 and the CPU 14 of the camera 101. Further, the contact pins 8 are brought into contact with electric contacts provided on the camera 101 to which the flash device 100 is attached, and protrude in a direction of contacting the electric contacts provided on the camera 101.

The control circuit 7 controls light emission of the xenon tube 2 in response to a control command from the CPU 14 of the camera 101. Further, the control circuit 7 performs processing for detecting information on user's operation of the rear-surface console section 1 and processing for transmitting information on a device status of the flash device 100 in response to a request from the CPU 14 of the camera 101.

Next, a description will be given, with reference to FIGS. 2A and 2B and FIG. 3, of the accessory shoe 102 of the flash device 100.

Figure 2A:
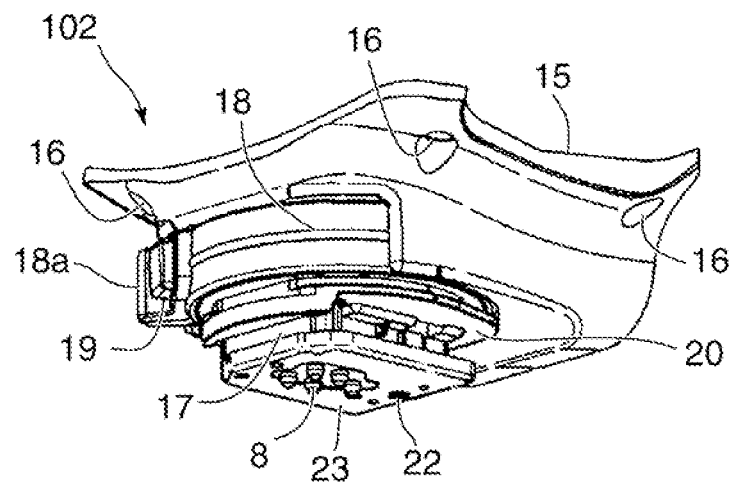
FIG. 2A is a perspective view showing an unlocked state of an accessory shoe.
Figure 2B:
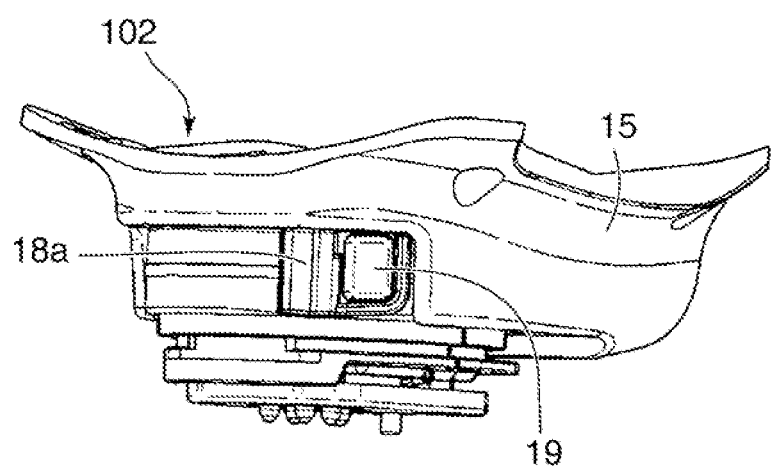
FIG. 2B is a perspective view showing a locked state of the accessory shoe.
Figure 3:
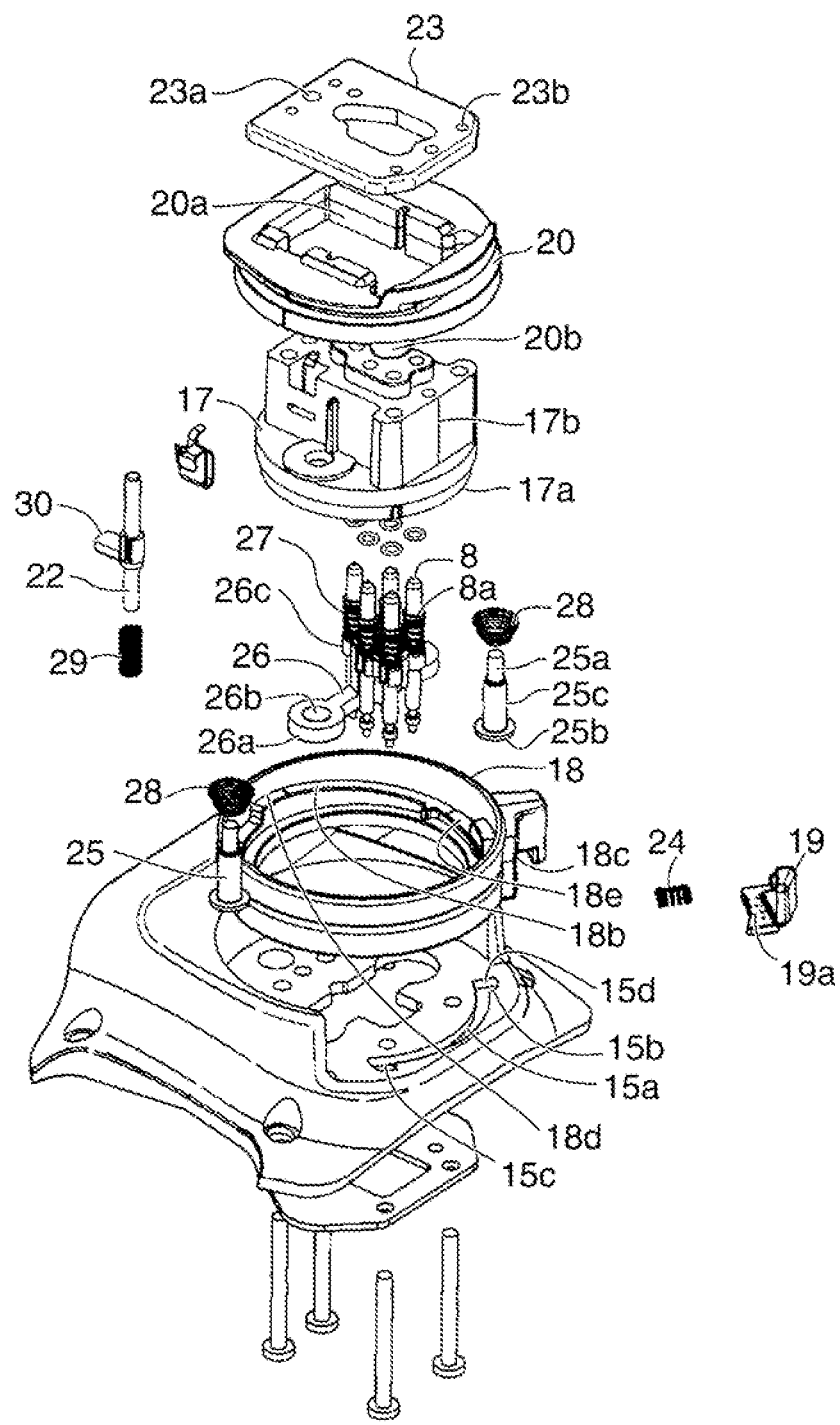
FIG. 3 is an exploded perspective view of the accessory shoe, as viewed from the bottom side thereof.

FIG. 2A is a perspective view showing an unlocked state of the accessory shoe 102, and FIG. 2B is a perspective view showing a locked state of the accessory shoe 102, FIG. 3 is a schematic exploded perspective view of the accessory shoe 102, as viewed from the bottom side thereof.

As shown in FIGS. 2A and 2B and FIG. 3, the accessory shoe 102 comprises a shoe case 15, a lock lever 18, an unlock button 19, a shoe mold 17, an accessory shoe-holding member 20, a shoe bracket 23, and a contact spring-holding member 26.

The shoe case 15 has a plurality of screw holes 16 through which respective screws are screwed in to rigidly secure the accessory shoe 102 to the bottom surface of the flash device 100.

The lock lever 18 corresponds to an operation member of the present invention. The lock lever 18 is formed into an annular shape, and is rotatable within a range of approximately 60 degrees. The lock lever 18 has a lever part 18a protruding radially outward from a circumferential portion thereof. Further, the lock lever 18 has an inner peripheral portion formed with a cam portion 18b.

When the accessory shoe 102 is in the unlocked state shown in FIG. 2A, a cam surface 18e of the cam portion 18b is cam-engaged with an engagement portion 20b of the accessory shoe-holding member 20 described hereinafter. On the other hand, when the accessory shoe 102 is in the locked state shown in FIG. 2B, a cam surface 18d of the cam portion 18b is cam-engaged with the engagement portion 20b of the accessory shoe-holding member 20.

The lock lever 18 has a recessed part 18c formed in the vicinity of the lever part 18a of the lock lever 18. The unlock button 19 is fitted into the recessed part 18c. Between the recessed part 18c and the unlock button 19, there is assembled an urging member 24 for urging the unlock button 19 radially outward from the lock lever 18. The unlock button 19 is formed with a lock latching part 19a.

The shoe case 15 is formed with a rail part 15a along which the lock latching part 19a slides in a direction in which the lock lever 18 is rotated. When the lock lever 18 is in the locking position of the accessory shoe 102 shown in FIG. 2B, the lock latching part 19a is urged by the urging force of the urging member 24 into a latching groove 15c formed in the rail part 15a, thereby being latched therein.

To unlock the accessory shoe 102, the unlock, button 19 is pressed against the urging force of the urging member 24, whereby the lock latching part 19a is unlatched from the latching groove 15c to enable rotation of the lock lever 18 in an unlocking direction.

On the other hand, when the lock lever 18 is in the unlocking position of the accessory shoe 102 shown in FIG. 2A, the lock latching part 19a is urged by the urging force of the urging member 24 into a latching groove 15d formed in the rail part 15a, thereby being latched in the latching groove 15d.

The latching groove 15d is formed with a sloped portion 15b that enables unlatching of the lock latching part 19a from the latching groove 15d even when the unlock button 19 is not pressed against the urging force of the urging member 24.

This makes it possible to rotate the lock lever 18 in a locking direction without pressing the unlock button 19 against the urging force of the urging member 24.

The shoe mold 17 has a disk part 17a on which is fitted the inner periphery of the lock lever 13, and a generally rectangular parallelepiped guide part 17b formed on the lower end surface of the disk part 17a.

The accessory shoe-holding member 20 has a cylindrical shape and has a central portion thereof formed with a rectangular insertion hole 20a through which the guide part 17b is inserted. The engagement portion 20b for cam-engagement with the cam portion 18b is formed on an outer periphery-side portion of the end surface of the accessory shoe-holding member 20 opposed to the guide part 17b.

The shoe bracket 23 corresponds to a shoe member of the present invention. The shoe bracket 23 is formed with a through hole 23a through which a lock pin 22 is inserted and a plurality of screw holes 23b through which screws are screwed in to rigidly secure the shoe bracket 23 to the bottom surface of the guide part 17b.

The contact spring-holding member 26 has a pair of arm parts 26a formed circumferentially apart from each other by approximately 180 degrees, and each of the arm parts 26a is formed with a screw insertion hole 26b for insertion of a stepped screw 25. Further, the contact spring-holding member 26 has contact holding parts 26c formed for holding the contact pins 8 and corresponding in number to the number of the contact pins 8.

Between each of the contact holding parts 26c and a stepped portion 8a of an associated one of the contact pins 8, there is supported a contact spring (contact urging member) 27 for urging the contact pin 8 toward an associated one of electric contacts 204 and 205 (see FIG. 4) of the camera-side accessory shoe 200. The contact spring-holding member 26 and the accessory shoe-holding member 20 correspond to a moving member of the present invention.

The lock pin 22 has a stopper 30 provided at a central portion thereof in the axial direction, for abutment with the accessory shoe-holding member 20. Further, the lock pin 22 has one end thereof inserted into a hole 17f (see FIGS. 5A and 5B) formed in the shoe mold 17 and the through hole 23a formed in the shoe bracket 23. The other end of the lock pin 22 has a coil spring 29 fitted thereon, and is inserted into a recessed portion 15e (see FIGS. 5A and 5B) formed in the shoe case 15.

The coin spring 29 is disposed in a compressed state between the surface of the shoe case 15 surrounding the opening of the recessed portion 15e and the stopper 30 so as to urge the lock pin 22 toward the shoe bracket 23. When the accessory shoe 102 is in the unlocked state, the lock pin 22 is held by the accessory shoe-holding member 20 in a position which is not protruded from the shoe bracket 23.

Figure 4:
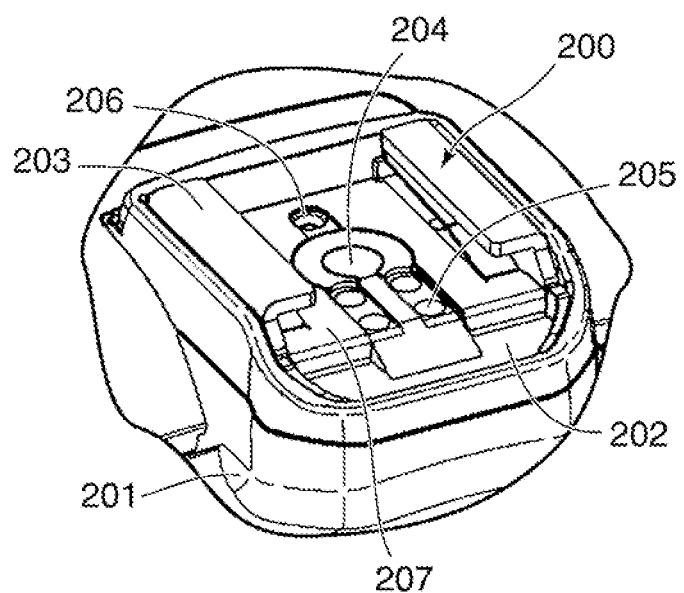
FIG. 4 is a perspective view of the appearance of a camera-side accessory shoe.

Next, a description will be given, with reference to FIG. 4, of the camera-side accessory shoe 200 to which the flash device 100 is removably attached. FIG. 4 is a perspective view of the appearance of the camera-side accessory shoe 200. The camera-side accessory shoe 200 is known, and hence it will be described only briefly.

As shown in FIG. 4, the camera-side accessory shoe 200 has a resin-made shoe base 202 rigidly secured to the upper surface of an exterior cover 201 of the camera 101 together with a shoe plate 203, with screws, not shown. The shoe base 202 is integrally formed with the electric contacts 204 and 205.

Further, the camera-side accessory shoe 200 has the shoe plate 203, made of metal, with which the shoe bracket 23 of the accessory shoe 102 of the flash device 100 is engaged. The shoe bracket 23 is inserted into the shoe plate 203 from the rear of the camera 101.

The shoe plate 203 is provided with a pair of left and right insertion guide parts, as viewed from the direction of insertion of the shoe bracket 23. Further, the shoe plate 203 is formed with a lock hole 206 for insertion and removal of the lock pin 22 of the accessory shoe 102. On the upper surface of the shoe base 202, there is mounted a shoe spring 207 for preventing vertical looseness of the shoe bracket 23 inserted in the shoe plate 203.

Figure 5A:
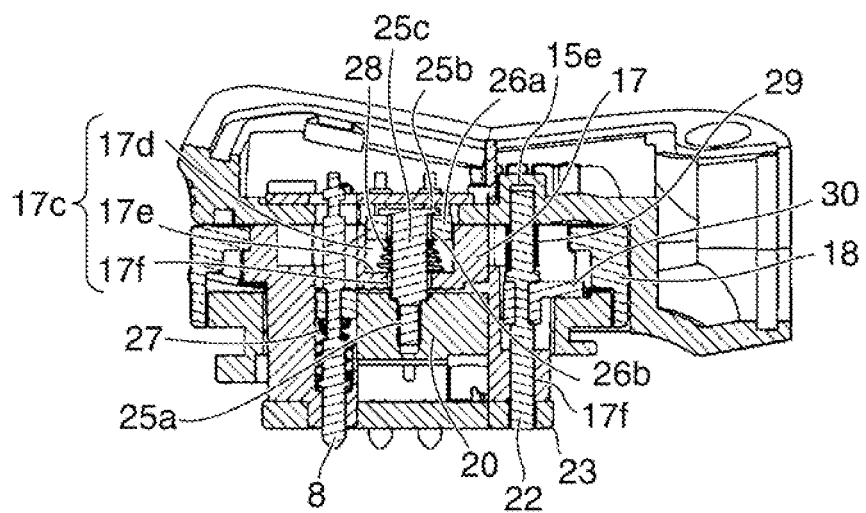
FIG. 5A is a side cross-sectional view of the flash device-side accessory shoe in the unlocked state.
Figure 5B:
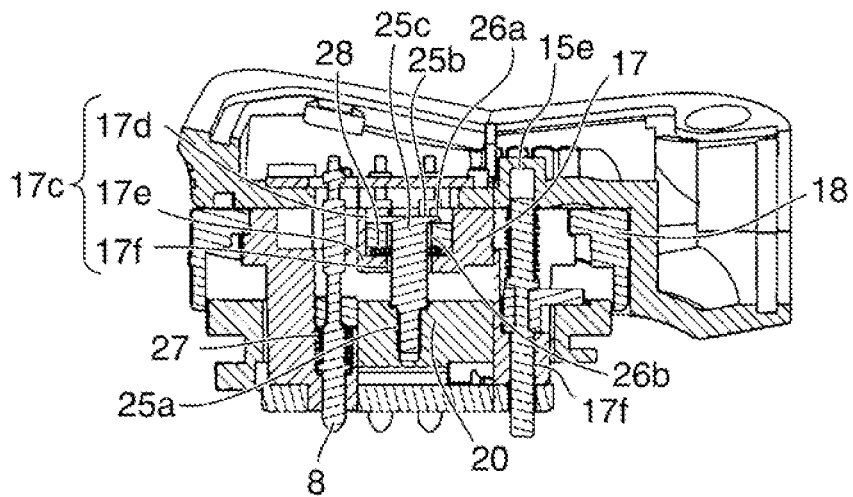
FIG. 5B is a side cross-sectional view of the flash device-side accessory shoe in the locked state.

FIG. 5A is a side cross-sectional view of the flash device-side accessory shoe 102 in the unlocked state, and FIG. 5B is a side cross-sectional view of the flash device-side accessory shoe 102 in the locked state.

Figure 6A:
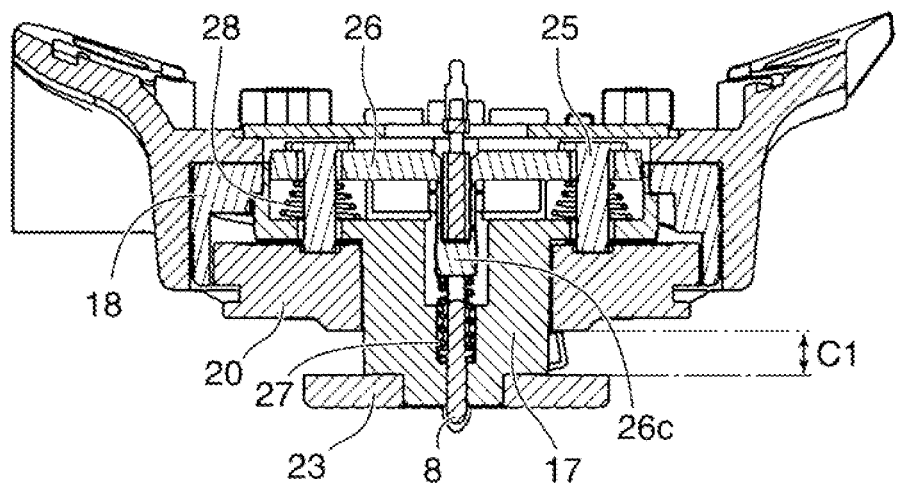
FIG. 6A is a central cross-sectional view of the flash device-side accessory shoe in the unlocked state, as viewed from the rear of the camera.
Figure 6B:
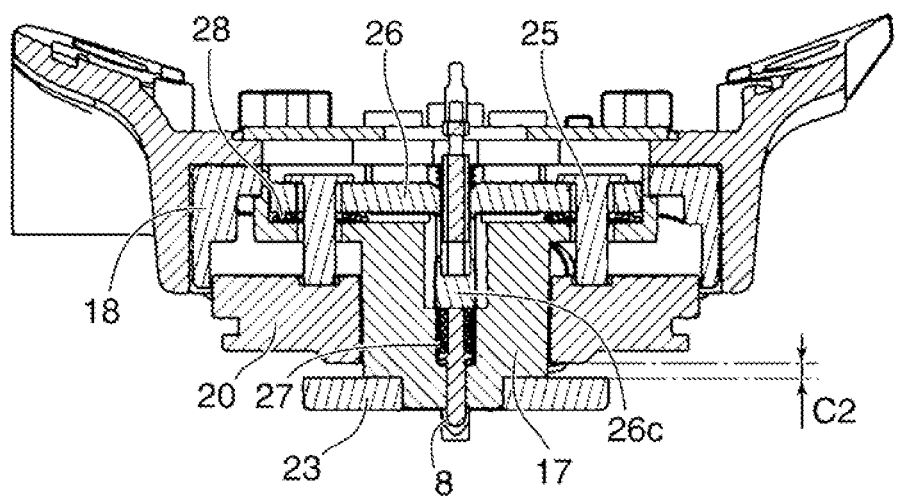
FIG. 6B is a central cross-sectional view of the flash device-side accessory shoe in the locked state, as viewed from the rear of the camera.

FIG. 6A is a central cross-sectional view of the flash device-side accessory shoe 102 in the unlocked state, as viewed from the rear of the camera 101. FIG. 6B is a central cross-sectional view of the flash device-side accessory shoe 102 in the locked state, as viewed from the rear of the camera 101.

As shown in FIGS. 3 and 5A, the stepped screw 25 has a head portion 25b formed at one end of a shaft portion 25c, and includes a screw shaft 25a smaller in diameter than the shaft portion 25c and extending from the other end of the shaft portion 25c. A shaft spring 28 is fitted on the shaft portion 25c.

Each of the stepped screws 25 is inserted through the screw insertion hole 26b formed in the associated arm part 26a of the contact spring-holding member 26 and an increased-diameter part 17d of a stepped hole 17c, and the screw shaft 25a is screwed into the accessory shoe-holding member 20.

At this time, the head portion 25b of the stepped screw 25 is brought into abutment with the associated arm part 26a of the contact spring-holding member 26, and the shaft spring 28 fitted on the shaft portion 25c of the stepped screw 25 is positioned between a bottom surface 17e of the stepped hole 17c and the arm part 26a of the contact spring-holding member 26.

When the accessory shoe 102 is in the unlocked state, the lever part 18a of the lock lever 18 is in a position shown in FIG. 2A, and a clearance between the accessory shoe-holding member 20 and the shoe bracket 23 becomes equal to C1 as shown in FIG. 6A. In this state, the shoe plate 203 of the camera-side accessory shoe 200 is insertable between the accessory shoe-holding member 20 and the shoe bracket 23.

At this time, the cam surface 18e (see FIG. 3) of the cam portion 18b of the lock lever 18 is cam-engaged with the engagement portion 20b of the accessory shoe-holding member 20. In this state, as shown in FIGS. 5A and 6A, the accessory shoe-holding member 20 is biased upward, as viewed therein, by the shaft springs 28 disposed between the bottom surface 17e of the increased-diameter part 17d of the stepped hole 17c of the shoe mold 17 and the arm parts 26a of the contact spring-holding member 26.

Therefore, the contact spring-holding member 26 is held in a lifted position, and the contact springs 27 for urging the respective contact pins 3 are hardly compressed. For this reason, in a state where the accessory shoe 102 of the flash device 100 is attached to the camera-side accessory shoe 200, the contact pins 8 are held in contact with the electric contacts 204 and 205, with a reduced urging force being applied to the electric contacts 204 and 205.

On the other hand, when the accessory shoe 102 is in the locked state, the lever part 18a of the lock lever 18 is in a position shown in FIG. 2B, and the clearance between the accessory shoe-holding member 20 and the shoe bracket 23 becomes equal to C2 (C1>C2) as shown in FIG. 6B. In this state, the shoe plate 203 of the camera-side accessory shoe 200 is sandwiched and pressed between the accessory shoe-holding member 20 and the shoe bracket 23.

More specifically, the cam action between the engagement portion 20b of the accessory shoe-holding member 20 and the cam portion 18b of the lock lever 18 causes the accessory shoe-holding member 20 to move downward, in a manner interlocked with the rotating operation of the lock lever 18, in unison with the contact spring-holding member 26 against the urging force of the shaft springs 28, whereby the accessory shoe-holding member 20 is held in a lowered position. At this time, the cam surface 18d (see FIG. 3) of the cam portion 18b of the lock lever 18 is cam-engaged with the engagement portion 20b of the accessory shoe-holding member 20.

In this state, the contact springs 27 for urging the respective contact pins 8 are compressed by the contact spring-holding member 26, whereby the contact pins 8 are held in contact with the electric contacts 204 and 205, with an increased urging force being applied to the electric contacts 204 and 205.

Further, as described hereinabove, the lock pin 22 is held by the stopper 30 in abutment with the accessory shoe-holding member 20 and is urged downward (toward the shoe bracket 23_ by the coil spring 29. Consequently, when the accessory shoe-holding member 20 is lowered, the lock pin 22 is moved by the urging force of the coil spring 29 by the same distance as the accessory shoe-holding member 20 is, and protrudes from the shoe bracket 23.

Then, the portion of the look pin 22 protruded from the shoe bracket 23 is fitted in the lock hole 206 of the camera-side accessory shoe 200, whereby the flash device 100 is prevented from coming off the camera-side accessory shoe 200.

As described above, according to the present embodiment, when the accessory shoe 102 is in the locked state, the contact pins 8 are pressed against the electric contacts 204 and 205 of the camera-side accessory shoe 200 by a larger urging force than when the accessory shoe 102 is in the unlocked state. Therefore, even if oxide films or the like formed on the electric contacts 204 and 205 are only slightly broken by the contact pins 8 which slide thereon when the flash device is attached, it is possible to bring the flash device 100 and the camera 101 into positive electrical, connection therebetween. On the other hand, when attaching or removing the flash device 100, the accessory shoe 102 is in the unlocked state, so that the contact pins 8 are held in contact with the electric contacts 204 and 205 by a reduced urging force.

This makes it possible not only to prevent the camera-side accessory shoe 200 from being scratched by repeated operations for attaching and removing the flash device 100, but also to secure positive electrical connection between the flash device 100 and the camera 101 without being affected by oxide films or the like.

Figure 7A:
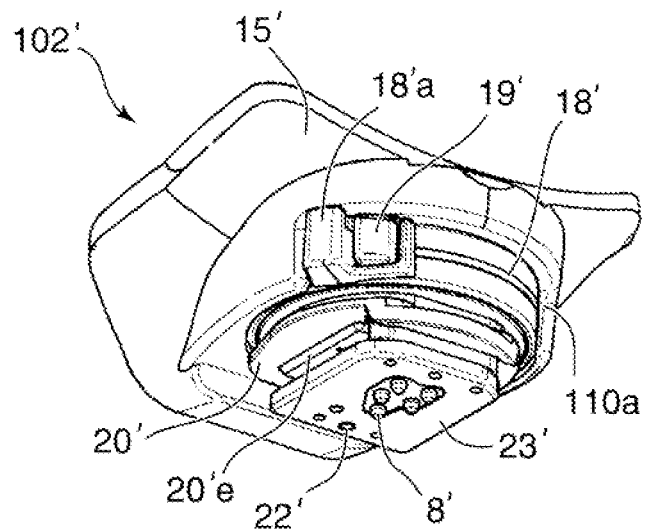
FIG. 7A is a perspective view showing the unlocked state of an accessory shoe of a flash device as a camera accessory device according to a second embodiment of the present invention.

Next, a description will be given, with reference to FIGS. 7A to 11, of a second embodiment of the present invention. FIG. 7A is a perspective view showing an unlocked state of an accessory shoe of a flash device as a camera accessory device according to the second embodiment, and FIG. 7B is a perspective view showing a locked state of the accessory shoe in FIG. 7A.

Figure 7B:
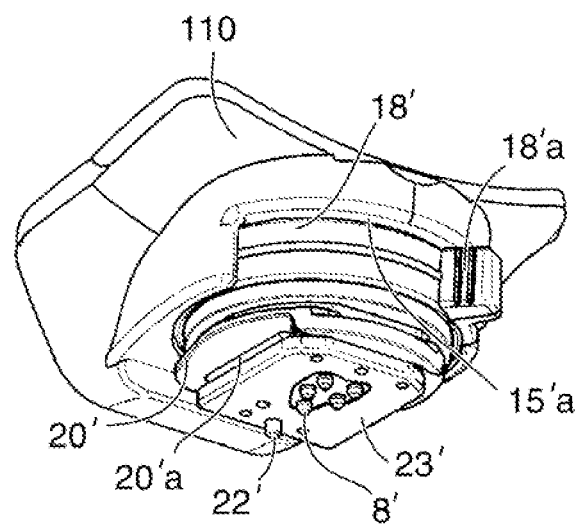
FIG. 7B is a perspective view showing the locked state of the accessory shoe in FIG. 7A.
Figure 8:
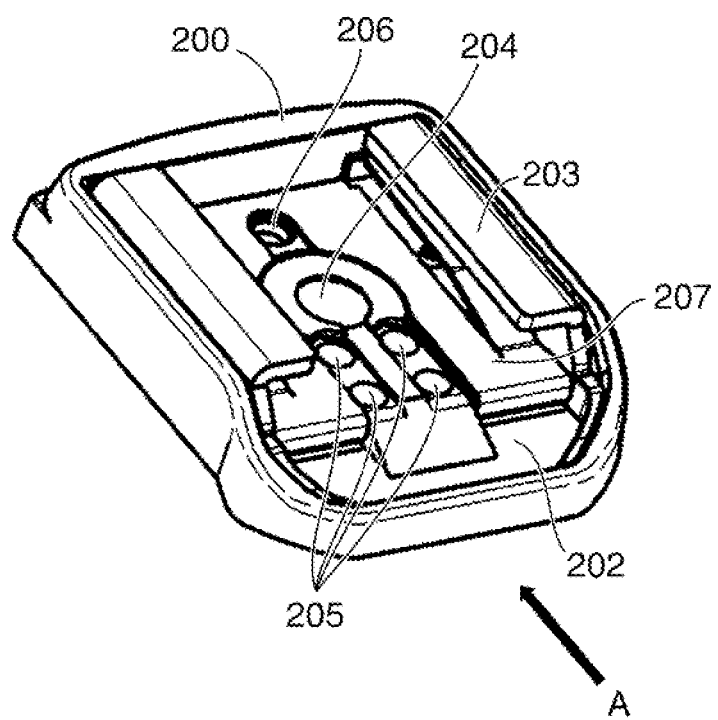
FIG. 8 is a perspective view of a camera-side accessory shoe to which is removably attached the flash device-side accessory shoe shown in FIGS. 7A and 7B.

FIG. 8 is a perspective view of a camera-side accessory shoe to which is removably attached the flash device00-side accessory shoe shown in FIGS. 7A and 7B.

First, the camera-side accessory shoe 200 will be described with reference to FIG. 8, for convenience of description. The camera-side accessory shoe 200 is known, and hence, only a brief description thereof will be given.

As shown in FIG. 8, the camera-side accessory shoe 200 has a resin-made shoe base 202 rigidly secured to the upper surface of an exterior cover 201 of a camera together with a metal shoe plate 203, with screws, not shown.

The shoe base 202 is integrally formed with electric contacts 204 and 205, and a shoe bracket 23' of an accessory shoe 102' of the flash device, described hereinafter, is inserted into the shoe plate 203 from the rear of the camera (i.e. in a direction indicated by an arrow A in FIG. 8), thereby being engaged with the same.

The shoe plate 203 is provided with a pair of left and right insertion guide parts, as viewed from the direction of insertion of the shoe bracket 23'. Further, the shoe plate 203 is formed with a lock hole 206 for insertion and removal of a lock pin 22' of the accessory shoe 102'. On the upper surface of the shoe base 202, there is mounted a shoe spring 207 for preventing vertical looseness of the shoe bracket 23' inserted in the shoe plate 203.

Next, the accessory shoe 102' of the flash device will be described with reference to FIGS. 7A and 7B.

As shown in FIGS. 7A and 7B, the accessory shoe 102' has the shoe bracket 23' disposed on the lower surface of a shoe case 15' of the flash device and configured to be inserted into the shoe plate 203. The shoe bracket 23' has a plurality of contact pins 8' protruding from an open part formed in a substantially central portion thereof, for contact with the respective electric contacts 204 and 205 of the camera-side accessory shoe 200.

A lock lever 18' is formed into an annular shape, and a lever part 18'a for rotating the lock lever 18' is formed on a circumferential portion thereof. The lock lever 18' is rotatable about an axis extending along an urging direction of the contact pins 8', described hereinafter, between a locking position (see FIG. 7B) and an unlocking position (see FIG. 7A) within a range of a cutout 15'a formed in the shoe case 15'.

Further, in the vicinity of the lever part 18'a of the lock lever 18', there is provided an unlock button 19'. By pressing the unlock button 19', it is possible to rotate the lock lever 18' from the locking position toward the unlocking position. The lock lever 18' corresponds to the operation member of the present invention.

An accessory shoe-holding member 20' moves vertically in accordance with the rotation of the lock lever 18'. When the lock, lever 18' is rotated to the locking position, the accessory shoe-holding member 20' sieves downward to tightly hold the shoe plate 203 of the camera-side accessory shoe 200 between a protrusion 20'e thereof and the shoe bracket 23'.

Figure 9A:
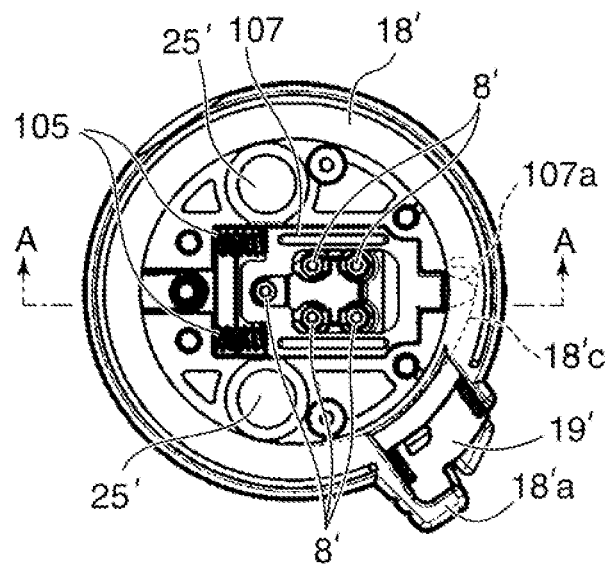
FIG. 9A is a plan view showing the unlocked state of the flash device-side accessory shoe.
Figure 9B:
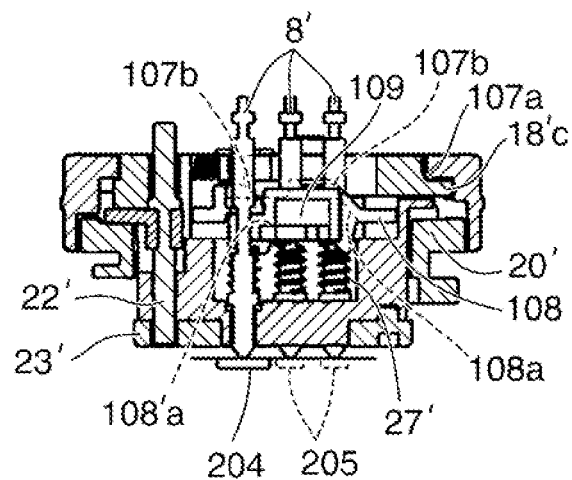
FIG. 9B is a cross-sectional view taken along line A-A of FIG. 9A.

Further, the lock pin 22' also moves downward in accordance with the downward motion of the accessory shoe-holding member 20' and is fitted into the look hole 206 of the camera-side accessory shoe 200 to thereby prevent the flash device from coming off the camera, FIG. 9A is a plan view showing the unlocked state of the accessory shoe 102' of the flash device, and FIG. 9B is a cross-sectional view taken along line A-A of FIG. 9A.

Figure 10A:
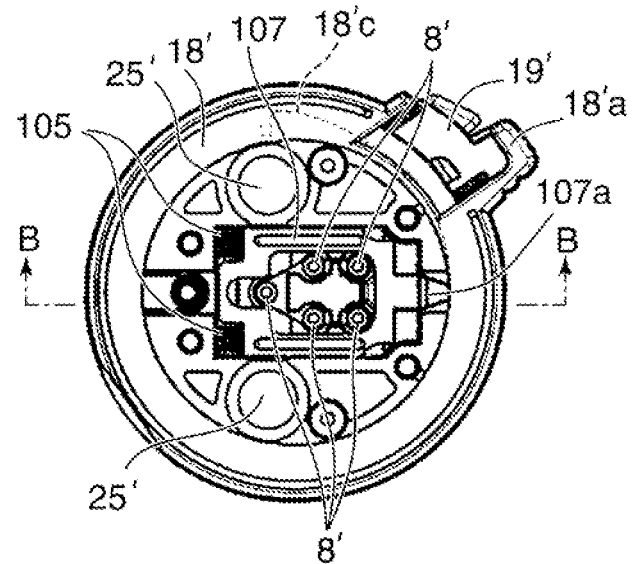
FIG. 10A is a plan view showing the locked state of the flash device-side accessory shoe.
Figure 10B:
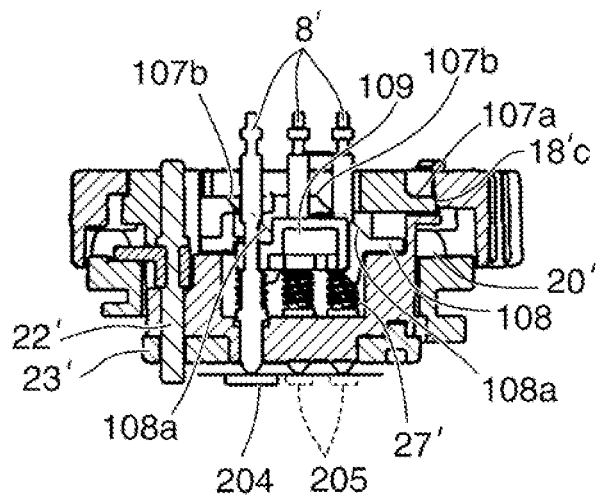
FIG. 10B is a cross-sectional view taken along line B-B of FIG. 10A.
Figure 11:
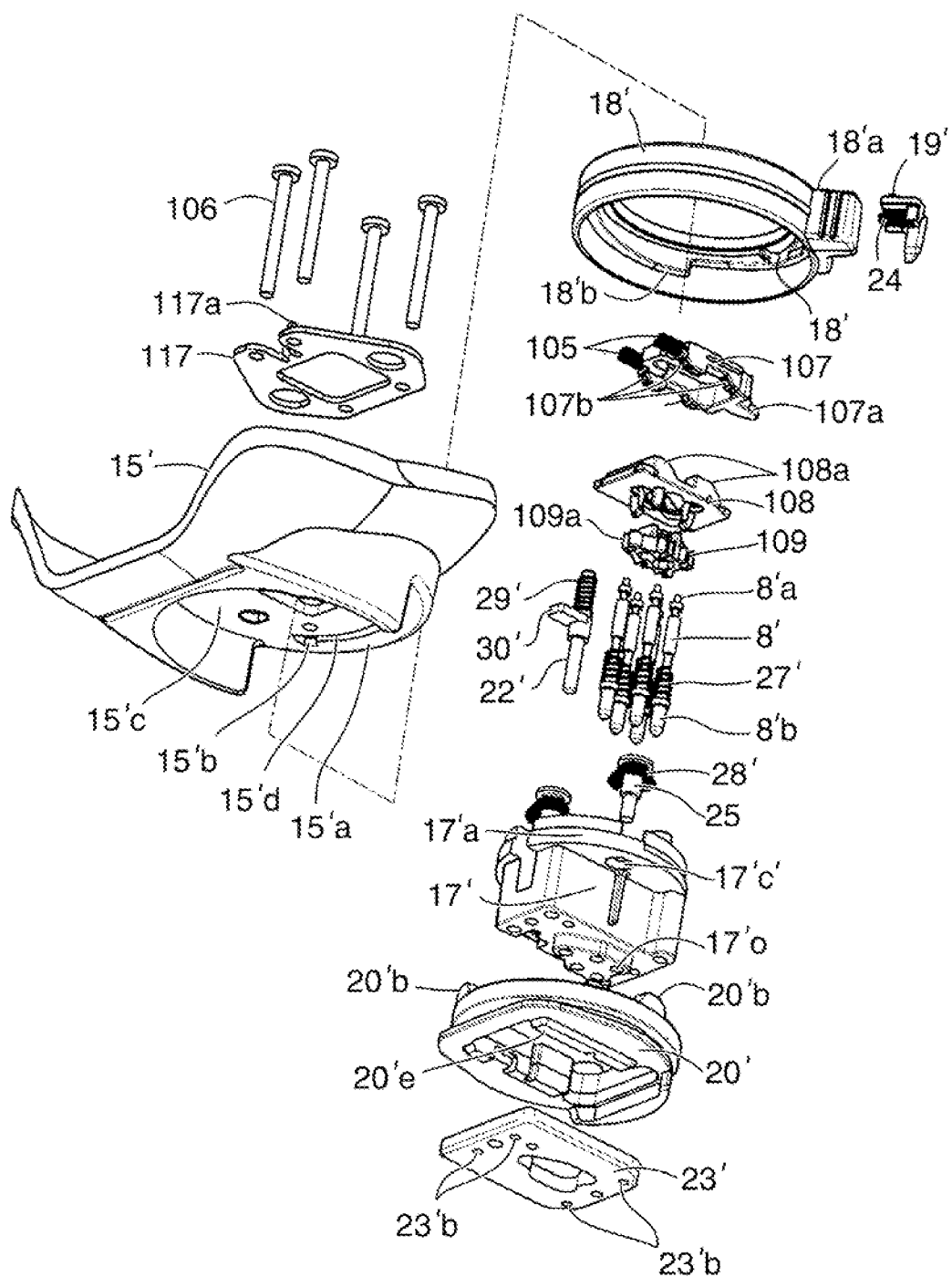
FIG. 11 is an exploded perspective view of the flash device-side accessory shoe.

FIG. 10A is a plan view showing the locked state of the accessory shoe 102' of the flash device, and FIG. 10B is a cross-sectional view taken along line B-B of FIG. 10A. FIG. 11 is an exploded perspective view of the accessory shoe 102' of the flash device.

Referring to FIGS. 9A and 9B to 11, the accessory shoe 102' has a ground plate 117, the shoe case 15', a shoe mold 17', and the shoe bracket 23', secured to each other with screws 106, and the screws 106 are fastened into respective screw holes 23'b formed in the shoe bracket 23'. A ground wire of the flash device is connected to a soldered part 117a of the ground plate 117.

The shoe bracket 23' is electrically connected to the ground plate 117 via the screws 106, so that when the accessory shoe 102' is attached to the camera-side accessory shoe 200, the shoe bracket 23' is engaged with the shoe plate 203, whereby the camera and the ground wire of the flash device are connected to each other.

The shoe mold 11' has a disk part 17'a formed with sliding holes 17'c', and a stepped screw 25' is inserted into each of the sliding holes 17'c'. The stepped screws 25' inserted in the respective sliding holes 17'c' are fastened to the accessory shoe-holding member 20', whereby the vertical movement of the accessory shoe-holding member 20' with respect to the shoe mold 17' is enabled. Further, the accessory shoe-holding member 20' is constantly urged upward by urging springs 28' fitted on the respective stepped screws 25'.

The shoe mold 17' accommodates a contact holder 109, a contact spring support member 108, and a moving member 107. The contact holder 109 is integrally formed with a hook part 109a, and the hook part 109a holds the contact pins 8' having respective contact springs 27' mounted thereon, such that the contact pins 8' can move in the axial direction. The contact spring support member 108 is accommodated in the shoe mold 17' in a manner covering the contact holder 109.

The contact spring support member 108 has an upper surface thereof formed with cam engagement portions 108a. Attached to the moving member 107 are return springs 105 for urging the moving member 107 in a direction (radial direction of the lock lever 18' in the present embodiment) orthogonal to the urging direction of the contact springs 27'. Further, the moving member 107 is formed with lift cams 107b for engagement with the respective cam engagement portions 108a of the contact spring support member 108.

Each of the contact pins 8' has an upper end 8'a thereof supported by the contact spring support member 108. Bach upper end 8'a is also supported by a lower surface 15'c of the shoe case 15', which has a relatively high rigidity, via the moving member 107.

On the other hand, a lower end 8'b of each of the contact pins 8' protrudes from an associated one of holes 17'o opening in the lower surface of the shoe mold 17', in a state urged by the associated contact spring 27'. Although in the present embodiment, the contact holder 109 and the contact spring support member 108 are formed as respective separate members, the contact spring support member 108 may be integrally formed with the contact holder 109.

The lock pin 22' is accommodated between the shoe case 15' and the shoe mold 17', and a lock pin stopper 30' and a coil spring 29' are attached to the lock pin 22'.

The lock pin 22' is urged downward by the coil spring 29', but since the lock pin stopper 30' is in abutment with the upper end of the accessory shoe-holding member 20', the lock pin 22' moves in the same direction as the accessory shoe-holding member 20' does, in accordance with the vertical motion of the accessory shoe-holding member 20'.

Further, the lock lever 18' is rotatably supported between the lower surface 15'c of the shoe case 15' and the disk part 17'a of the shoe mold 17', and the unlock button 19' is attached to the lever part 18'a of the lock lever 18' via an urging spring 24'. Furthermore, the lock lever 18' has an inner peripheral portion thereof formed with a lift cam 18'b and a moving cam 18'c.

The lift cam 18'b is engaged with a plurality of protrusions 20b' formed on the upper surface of the accessory shoe-holding member 20', whereby the cam action between the lift cam 18'b and the protrusions 20'b causes the accessory shoe-holding member 20' to move vertically.

Further, the moving cam 18'c is engaged with a cam engagement portion 107a formed in the moving member 107, whereby the cam action between the moving cam 18'c and the cam engagement portion 107a causes the moving member 107 to move in the radial direction of the lock lever 18'.

On the lower surface 15'c of the shoe case 15', there is formed an arcuate rail groove 15'd having a latching groove 15'b. A protrusion (not shown) formed on the unlock button 19' is slidably engaged with the rail groove 15'd. When the protrusion slides into the latching groove 15'b at the locking position of the lock lever 18' to be thereby latched in the latching groove 15'b, the rotation of the lock lever 18' in the unlocking direction is restricted.

Next, the operation of the accessory shoe 102' of the flash device will be described in more detail with reference to FIGS. 9A and 9B and FIGS. 10A and 10B.

The moving cam 18'c of the lock lever 18' and the cam engagement portion 107a of the moving member 107 correspond to a first cam mechanism of the present invention, and the cam engagement portion 1.08a of the contact spring support member 108 and the lift cam 107b of the moving member 107 correspond to a second cam mechanism of the present invention.

In states shown in FIGS. 9A and 9B and FIGS. 10A and 10B, the accessory shoe 102' of the flash device has been attached to the camera-side accessory shoe 200, and the contact pins 8' of the accessory shoe 102' are held in contact with the respective electric contacts 204 and 205 of the camera-side accessory shoe 200.

In the unlocked state of the accessory shoe 102' shown in FIGS. 9A and 9B, the moving member 107 is biased to a right-side position, as viewed therein, by the urging force of the return springs 108, in a state where the moving cam 18'c of the look lever 18' is held in engagement with the cam engagement portion 107a of the moving member 107.

At this time, the cam top of the lift cam 107b of the moving member 107 does not act on the cam engagement portion 108a of the contact spring support member 108. For this reason, the contact spring support member 108 is held in the lifted position, and each of the contact springs 27' for urging the respective contact pins 8' is held in a substantially non-compressed state. Therefore, the contact pins 8' are held in contact with the respective electric contacts 204 and 205, with a reduced urging force being applied to the electric contacts 204 and 205.

Further, since the cam top of the lift cam 18'b of the lock lever 18' does not act on the protrusions 20b, the accessory shoe-holding member 20' is held in the lifted position together with the lock pin 22' by the urging force of the urging springs 28'.

On the other hand, in the locked state of the accessory shoe 102' shown in FIGS. 10A and 10B, the cam action between the moving cam 18'c of the look lever 18' and the cam engagement portion 107a of the moving member 107 causes the moving member 107 to move leftward, as viewed therein, against the urging force of the return springs 105.

At this time, the cam top of the lift cam 107b of the moving member 107 acts on the cam engagement portion 108a of the contact spring support member 108 to thereby lower the contact spring support member 108, and the contact springs 27' for urging the respective contact pins 8' are compressed by the contact spring support member 108. Therefore, the contact pins 8' are held in contact with the respective electric contacts 204 and 205, with an increased urging force being applied to the electric contacts 204 and 205.

Further, since the cam top of the lift cam 18'b of the loch lever 18' acts on the protrusions 20b, the accessory shoe-holding member 20' is lowered together with the lock pin 22' against the urging force of the urging springs 28', and the lock pin 22' is fitted into the lock hole 206 of the camera-side accessory shoe 200.

As described above, according to the present embodiment, when the accessory shoe 102' is in the locked state, the contact pins 8' are pressed against the electric contacts 204 and 205 of the camera-side accessory shoe 200 with a larger urging force than when the accessory shoe 102' is in the unlocked state. Therefore, even if oxide films or the like formed on the electric contacts 204 and 205 are only slightly broken by the contact pins 8' which slide thereon when the flash device is attached, it is possible to bring the flash device 100 and the camera 101 into positive electrical connection therebetween.

On the other hand, when attaching or removing the flesh device 100, the accessory shoe 102 is in the unlocked state, so that the contact pins 8' are held in contact with the electric contacts 204 and 205 with a reduced urging force. This makes it possible not only to prevent the camera-side accessory shoe 200 from being scratched by sliding of the contact pins 8', but also to prevent contact failure from being caused by resin powder or the like produced due to abrasion.

Further, in the present embodiment, the urging force of the contact springs 27' is always supported by the lower surface 15'c of the shoe case 15' having a relatively high rigidity via the contact spring support member 108 and the moving member 107, so that it is possible to maintain a stable urging force.

The first and second embodiments described heretofore are given as examples of an accessory having an urging mechanism that increases an urging force for urging contact members in a direction of bringing the contact members into contact with electric contacts of an image pickup apparatus, according to movement of an associated moving member from a second position for unlocking the accessory from the image pickup apparatus to which the accessory is attached to a first position for locking the accessory to the image pickup apparatus, by way of example. In the first embodiment, the urging mechanism includes the contact spring-holding member 26, the contact spring 27, and so forth, and in the second embodiment, the urging mechanism includes the moving cam 18'c, the contract springs 27', the moving member 107, the cam engagement portion 107a, the lift cam 107b, the contact spring support member 108, the cam engagement portion 108a, and so forth.

Noted that the present invention is not limited to the above-described embodiments, but the material, shape, dimensions, form, number, location, etc. of each of the members can be changed without departing from the spirit and scope of the present invention.

For example, although in the above embodiments, the descriptions are given of the accessory shoe of the flash device which is an example of the camera accessory device, the present invention is also applicable to the accessory shoes of other camera accessory devices, such as a communication device and a GPS unit.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Applications No. 2012-041573, filed Feb. 28, 2012, and No. 2012-041574, filed Feb. 28, 2012, which are hereby incorporated by reference herein in their entirety.

What is claimed is:

1. A camera accessory device that is removably attached to a camera-side accessory shoe having an electric contact, comprising:
   an operation member;
   a shoe member configured to be engaged with the camera-side accessory shoe;
   a contact pin configured to be held in contact with the electric contact in a state where said shoe member is engaged with the camera-side accessory shoe; and
   a moving member configured to be movable, in accordance with operation of said operation member, to a shoe member-locking position for locking said shoe member to the camera-side accessory shoe and a shoe member-unlocking position for unlocking said shoe member from the camera-side accessory shoe, and
   a contact urging member configured to urge said contact pin held in contact with the electric contact toward the electric contact,
   wherein said contact urging member is more compressed in a state that said moving member has moved to the shoe member-locking position than in a state that said moving member has moved to the shoe member-unlocking position, and
   wherein said contact pin is urged by said contact urging member such that an urging force applied to the electric contact becomes larger in a state that said moving member has moved to the shoe member-locking position than in a state that said moving member has moved to the shoe member-unlocking position.

2. The camera accessory device according to claim 1, wherein said operation member has a cam portion and is configured to be operable for rotation, said moving member has an engagement portion for engagement with said cam portion, and cam action between said cam portion and said engagement portion causes, in accordance with a rotational operation to said operation member, said moving member to move to the shoe member-locking position or to the shoe member-unlocking position.

3. A camera accessory device that is removably attached to a camera-side accessory shoe having an electric contact, comprising:
   a contact pin held in contact with the electric contact in a state where the camera accessory device is attached to the camera-side accessory shoe;
   a first member configured to be movable in an urging direction of said contact pin;
   a second member configured to be movable in a direction orthogonal to the urging direction of said contact pin;
   an operation member configured to be operable between a locking position for locking the camera accessory device to the camera-side accessory shoe and an unlocking position for unlocking the camera accessory device from the camera-side accessory shoe, in the state where the camera accessory device is attached to the camera-side accessory shoe;
   a first cam mechanism provided between said operation member and said second member and configured to move said second member in accordance with operation of said operation member; and
   a second cam mechanism provided between said second member and said first member and configured to move said first member in accordance with motion of said second member,
   wherein when said operation member is operated from the unlocking position to the locking position, said first member moves in a direction of increasing an urging force of said contact pin against the electric contact.

4. The camera accessory device according to claim 3, wherein said operation member is formed into an annular shape and configured to be operable for rotation about an axis extending along the urging direction of said contact pin, and wherein said first cam mechanism moves said second member in a radial direction of said operation member in accordance with the operation of said operation member.

5. The camera accessory device according to claim 3, wherein said first member supports a contact spring for urging said contact pin held in contact with the electric contact toward the electric contact, and moves in a direction for compressing said contact spring, when said operation member is operated from the unlocking position to the locking position.

6. An accessory device that is removably attached to an image pickup apparatus, comprising:
   a moving member configured to be movable to a first position for locking the accessory device to the image pickup apparatus to which the accessory device is attached and a second position for unlocking the accessory device from the image pickup apparatus to which the accessory device is attached;
   a contact member configured to be brought into contact with an electric contact provided on the image pickup apparatus to which the accessory device is attached; and
   an urging mechanism configured to increase an urging force for urging said contact member in a direction in which said contact member is brought into contact with the electric contact, in accordance with movement of said moving member from the second position to the first position,
   wherein said urging mechanism includes a contact urging member configured to urge said contact member, and
   wherein said urging mechanism causes one end of the contact urging member, which is opposed to the other end of the contact urging member to which said contact member is brought into contact with the electric contactto move, in accordance with movement of said moving member from the second position to the first position, to the direction in which said contact member is brought into contact with the electric contact to thereby increase the urging force for urging said contact member in the direction in which said contact member is brought into contact with the electric contact.

7. The accessory device according to claim 6, wherein said urging mechanism has said contact urging member compressed in accordance with movement of said moving member from the second position to the first position, to thereby increase the urging force for urging said contact member in the direction in which said contact member is brought into contact with the electric contact.

8. The accessory device according to claim 7, wherein in accordance with the movement of said moving member from the second position to the first position, said urging mechanism is moved in the same direction as a moving direction of said moving member to thereby have said contact urging member thereof compressed.

9. The accessory device according to claim 8, wherein part of said urging mechanism is fixed to said moving member.

10. The accessory device according to claim 7, further comprising:
   an operation member configured to be operated for moving said moving member to the first position and the second position, and
   wherein said urging mechanism includes a second moving member configured to be movable in a direction orthogonal to the moving direction of said moving member, a third moving member configured to be movable in the same direction as the moving direction of said moving member, a first mechanism provided between said operation member and said second moving member and configured to move said second moving member in accordance with operation of said operation member, and a second mechanism provided between said second moving member and said third moving member and configured to move said third moving member in accordance with movement of said second moving member, and said third moving member causes one end of the contact urging member, which is opposed to the other end of contact urging member to which said contact member is brought into contact with the electric contact, to move in accordance with operation of said operation member for moving said moving member from the second position to the first position.

11. An accessory device that is removably attached to an image pickup apparatus, comprising:
   a moving member configured to be movable to a first position for locking the accessory device to the image pickup apparatus to which the accessory device is attached and a second position for unlocking the accessory device from the image pickup apparatus to which the accessory device is attached;
   a contact member configured to be brought into contact with an electric contact provided on the image pickup apparatus to which the accessory device is attached, said contact member protruding in a direction of being brought into contact with the electric contact;
   an urging mechanism configured to increase an urging force for urging said contact member in a direction in which said contact member is brought into contact with the electric contact, in accordance with movement of said moving member from the second position to the first position; and
   an operation member configured to be operated for moving said moving member to the first position and the second position,
   wherein said urging mechanism includes a resilient member configured to urge said contact member toward the electric contact, in the state where the accessory device is attached to the image pickup apparatus, and has said resilient member compressed in accordance with movement of said moving member from the second position to the first position, to thereby increase the urging force for urging said contact member in the direction in which said contact member is brought into contact with the electric contact, and
   wherein said urging mechanism includes a second moving member configured to be movable in a direction orthogonal to the moving direction of said moving member, a third moving member configured to be movable in the same direction as the moving direction of said moving member, a first mechanism provided between said operation member and said second moving member and configured to move said second moving member in accordance with operation of said operation member, and a second mechanism provided between said second moving member and said third moving member and configured to move said third moving member in accordance with movement of said second moving member, and said third moving member compresses said resilient member in accordance with operation of said operation member for moving said moving member from the second position to the first position.

12. The accessory device according to claim 11, wherein said operation member is formed to have an annular shape and is configured to be operable for rotation about an axis extending along the moving direction of said moving member, and wherein said first mechanism moves said second moving member in a radial direction of said operation member in accordance with operation of said operation member.

13. The accessory device according to claim 11, wherein said operation member is formed to have an annular shape and is configured to be operable for rotation about an axis extending along the moving direction of said moving member, and wherein said first mechanism moves said second moving member in a radial direction of said operation member in accordance with operation of said operation member.

* * * * *